US006915381B2

(12) United States Patent
Fujie et al.

(10) Patent No.: US 6,915,381 B2
(45) Date of Patent: Jul. 5, 2005

(54) SYSTEM AND METHOD FOR TRANSFERRING DATA FROM A SECONDARY STORAGE CONTROLLER TO A STORAGE MEDIA AFTER FAILURE OF A PRIMARY STORAGE CONTROLLER

(75) Inventors: Yoshihiro Fujie, Fujisawa (JP); Atsushi Watanabe, Zama (JP)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 10/316,618

(22) Filed: Dec. 10, 2002

(65) Prior Publication Data

US 2003/0110330 A1 Jun. 12, 2003

(30) Foreign Application Priority Data

Dec. 12, 2001 (JP) ........................................ 2001-378580

(51) Int. Cl.[7] .............................................. G06F 12/00
(52) U.S. Cl. ......................... 711/114; 710/131; 710/316
(58) Field of Search ......................... 711/114; 710/131, 710/316

(56) References Cited

U.S. PATENT DOCUMENTS

| | | | | |
|---|---|---|---|---|
| 6,338,110 B1 | * | 1/2002 | van Cruyningen | 710/131 |
| 6,381,675 B1 | * | 4/2002 | Okada | 711/114 |
| 6,542,954 B1 | * | 4/2003 | Aruga | 710/316 |
| 6,654,831 B1 | * | 11/2003 | Otterness et al. | 710/74 |
| 6,721,317 B2 | * | 4/2004 | Chong, Jr. | 370/389 |
| 6,792,486 B1 | * | 9/2004 | Hanan et al. | 710/74 |
| 6,795,850 B2 | * | 9/2004 | Wu et al. | 709/213 |

* cited by examiner

*Primary Examiner*—Mano Padmanabhan
*Assistant Examiner*—Mehdi Namazi

(74) *Attorney, Agent, or Firm*—Arthur J. Samodovitz

(57) ABSTRACT

A storage control and switch unit for transferring data between a host computer and first, second, third and fourth storage media. A first storage controller has an operative serial ATA connection with each of the first and second storage media and an inoperative serial ATA connection to each of the third and fourth storage media. A second storage controller has an operative serial ATA connection with each of the third and fourth storage media and an inoperative serial ATA connection to each of the first and second storage media. First, second, third and fourth switches are logically interposed between the first, second, third and fourth storage media, respectively, and the first and second storage controllers to select which serial ATA connection to each storage media is operative and which is inoperative. In response to failure of one of the storage controllers, the other storage controller changes the operable switches of the one storage controller to be inoperable and changes the inoperable switches of the other storage controller to be operable. The other storage controller is granted management authority for the arrays controlled by the one storage controller before the failure.

Disclosed is a storage unit provided with redundancy, an information processing apparatus including the same, and a recovery method of an information storage system. A storage unit of the present invention includes a plurality of arrays, each including at least one storage medium; point-to-point controllers, each of which manages the corresponding one of the plurality of arrays and communicates with the same, each of point-to-point controllers being connectable to all the storage medium; switching means for switching the point-to-point controllers, each managing the arrays; means for detecting a failure of each point-to-point controller; and means for driving the switching means in response to detection of the failure of each controller. The storage unit changes management states of arrays in response to the detection of a failure.

13 Claims, 16 Drawing Sheets

FIG.9

| IDENTIFIER | CONTROLLER | MEDIUM IDENTIFIER | | | | MANAGEMENT FLAG |
|---|---|---|---|---|---|---|
| ID-A | CONTROLLER 60 | A-1 | A-2 | A-3 | A-4 | 0 |
| ID-B | CONTROLLER 62 | B-1 | B-2 | B-3 | B-4 | 1 |
| ... | ... | ... | | | | |

| EN | SEL | RX0 | RX1 | TX |
|----|-----|-----|-----|-----|
| 1 | 0 | RX | HZ | TX0 |
| 1 | 1 | HZ | RX | TX1 |
| 0 | 0 | HZ | HZ | HZ |
| 0 | 1 | HZ | HZ | HZ |

PRIOR ART

SYSTEM AND METHOD FOR TRANSFERRING DATA FROM A SECONDARY STORAGE CONTROLLER TO A STORAGE MEDIA AFTER FAILURE OF A PRIMARY STORAGE CONTROLLER

BACKGROUND OF THE INVENTION

The present invention relates generally to RAID data storage systems and methods, and deals more specifically with a system and method for transferring data from a secondary storage controller to a storage media after failure of a primary storage controller for said storage media.

It was previously known that data security is improved by data redundancy such as provided by RAID. RAID (redundant array of independent disks) systems are well known today, and there are several levels of RAID. To implement one of the RAID levels, a plurality of storage controllers and storage media such as a hard disk drive are connected by a shared bus interface such as a parallel SCSI bus. Alternately, the plurality of storage controllers and storage media may be connected in a dual loop using Fiber Channel Arbitrated Loop shared bus protocol. An ATA shared bus interface is also known. The SCSI and Fiber Channel shared interfaces are typically used in applications requiring high reliability such as those involving a server. The ATA interface is typically used for less secure storage media such as those for a desktop personal computer. This is because the ATA interface is lower cost than the SCSI or the Fiber Channel the interface.

FIG. 17 is a view schematically showing a RAID system using the previously known ATA interface. As shown in FIG. 17, a storage controller 90 is connected to and manages a plurality of storage arrays 92 and 94. Each of the arrays 92 and 94 comprises one or more storage physical media 96 such as a hard disk. The controller 90 utilizes the ATA interface 98 to record/store data on the arrays 92 and 94. The ATA interface 98 is also coupled to a host computer 99 via a proper interface such as Fiber Channel, to exchange data with the host.

FIG. 18 is a block diagram showing in more detail the RAID system using the conventional ATA interface shown in FIG. 17. As shown in FIG. 18, the controller 90 includes a fiber channel connector 100, fiber channel-host protocol control means 102, a processor 104, and a cache memory 106 connected to the processor 104. The controller 90 communicates with another RAID system 101 or the host computer 99 via the fiber channel connector 100. Data received by the controller 90 is converted into a proper protocol via the protocol control means 102, and recorded in each of the storage media 96 having a proper address by the processor 104.

As shown in FIG. 18, the conventional ATA interface 98 is connected to each of the storage media 96 via suitable connection means 108, and manages these storage media 96, thus enabling data transfer between the host computer and each of the storage media via the ATA interface 98.

The ATA interface 98 may perform data transfer by use of a parallel transfer technology such as ATA/100 in view of its improved data transfer rate. Nevertheless, the ATA technology within ATA/100 has limitations. The following attempts have been made to improve the data transfer rate of the ATA. A data transfer rate having a clock frequency of 50 MHz and a maximum transfer rate of 100 Mbytes/s with a data width of 16 bits has been achieved for the ATA/100 interface. In order to further improve the data transfer rate, another attempt of doubling the data width to 32 bits or increasing a frequency of a strobe signal has been made. However, it has been known that the increase of the data width or the increase of the frequency of the strobe signal causes difficulties in data synchronization between signal lines, and significant interference/noise between the signal lines. Therefore, in the ATA interface, when the transfer rate of UltraDMAmode3 (44.4 Mbytes/s) or more is used, a connection with an 80 wire flat cable and 40 pins is used. Each pin is accompanied by a ground, and the interference between the signal lines is prevented.

In recent years, due to speedup in computer systems and an increase in the amount of data to be stored, the data transfer rate of the interface of the controller requires further improvement. Also, reliability of the data transfer from the storage controller to the storage media must be maintained. Also, the cost of the data storage system should be minimized despite the need for redundancy of data storage.

Such demands on the system will likely further increase, especially where the storage unit is separated from the server and connected to the server by the Fiber Channel as an independent storage area network (SAN), or in the case where the storage unit is connected to the server via the Ethernet(registered trademark) link for use.

Accordingly, an object of the present invention is to provide a high speed interface between the storage controller and redundant storage media.

Another object of the present invention is to provide such a high speed while maintaining a low cost and high reliability.

SUMMARY OF THE INVENTION

The invention resides in a storage control and switch unit for transferring data between a host computer and first, second, third and fourth storage media. A first storage controller (within the storage control and switch unit) has an operative point-to-point connection with each of the first and second storage media to manage arrays on the first and second storage media. The first storage controler also has an inoperative point-to-point connection to each of the third and fourth storage media. A second storage controller (within the storage control and switch unit) has an operative point-to-point connection with each of the third and fourth storage media to manage arrays on the third and fourth storage media. The second storage controller also has an inoperative point-to-point connection to each of the first and second storage media. First, second, third and fourth switches are logically interposed between the first, second, third and fourth storage media, respectively, and the first and second storage controllers to select which point-to-point connection to each storage media is operative and which point-to-point connection to the storage media is inoperative. In response to failure of one of the storage controllers, the other storage controller changes the operable switches of the one storage controller to be inoperable and changes the inoperable switches of the other storage controller to be operable. The other storage controller is granted management authority for the arrays controlled by the one storage controller before the failure. According to one feature of the present invention, each point-to-point connection is made by a serial ATA unit.

According to another feature of the present invention, each controller implements a RAID level and each of the arrays is configured so as to enable redundant data storage. A mirror copy of each array is generated to provide the data redundancy. When one of the storage controllers fails, the switching means connects the array associated with the failed controller to the normal controller and also gives a control right for this array to the normal controller. This allows the normal controller to write the data into this storage array, assuring data redundancy. The normal controller retains management control of its original storage media/arrays.

A table may be used according to the present invention in controlling the switch in the failure mode describe above. The table includes identifiers given to each of the plurality of point-to-point controllers. Each identifier corresponds to a storage medium managed by the point-to-point controller. In the storage unit of the present invention, the plurality of point-to-point controllers may include means for detecting the failure of each of the plurality of point-to-point controllers, acquiring the identifier unique to the point-to-point controller on a side where the failure has occurred, and executing a predetermined processing for changing the management state. The change of the management state of each of the plurality of arrays may include a process to allow the point-to-point controller where no failure occurred to manage the array assigned to the point-to-point controller where the failure has occurred. In the storage unit of the present invention, it is preferable that each of the plurality of point-to-point controllers includes a serial ATA interface.

BRIEF DESCRIPTION OF THE DRAWINGS

FIG. 9 is a view showing an embodiment of a correspondence table used, according to the present invention.

DETAILED DESCRIPTION OF THE PREFERRED EMBODIMENTS

Figure 1:
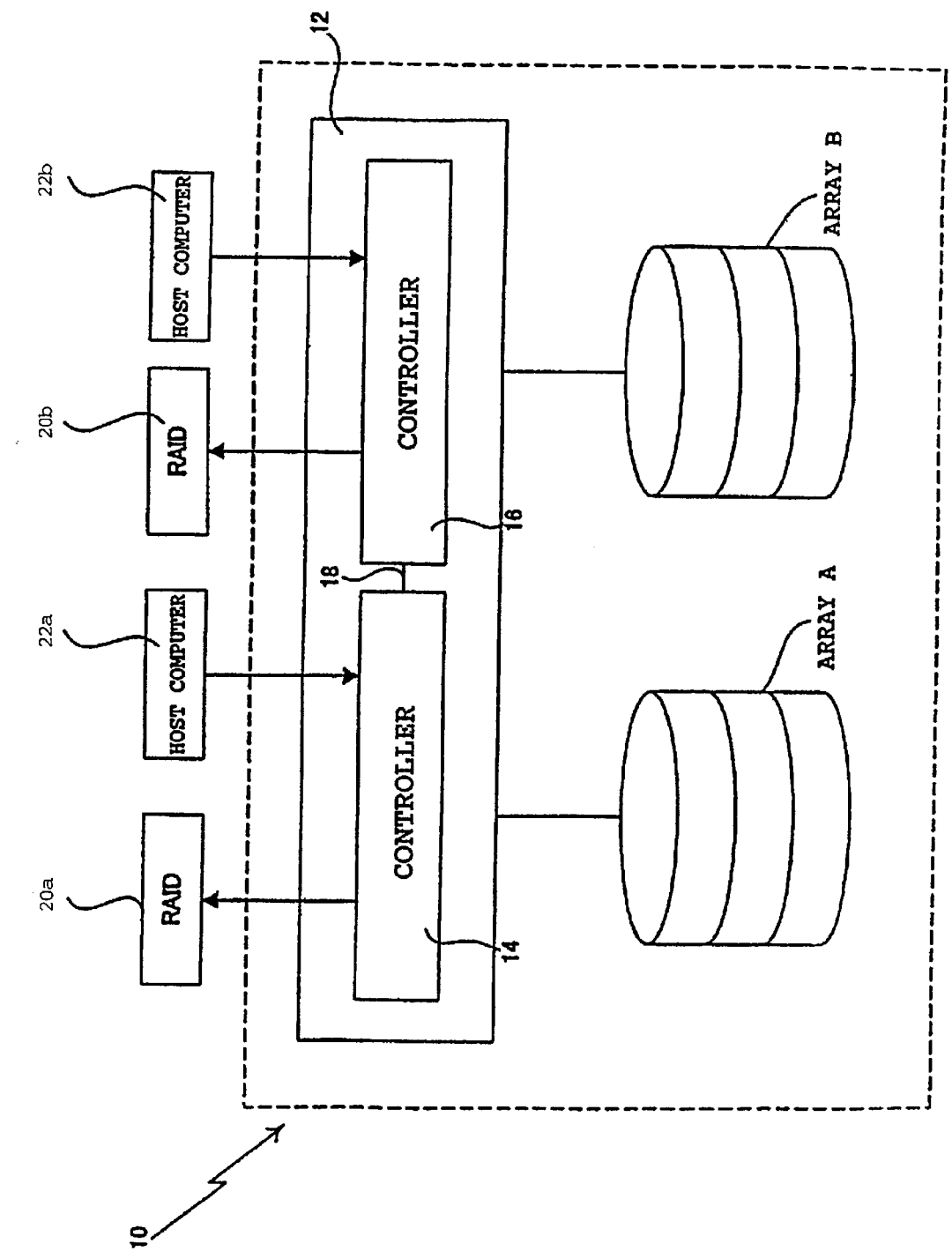
FIG. 1 is a block diagram schematically showing a storage unit of the present invention.

Next, a detailed description will be made of the present invention along with a specific embodiment shown in the drawings. However, the present invention is not limited to the embodiments described below.

FIG. 1 is a view schematically showing a constitution of a storage unit 10 using a redundant storage method of the present invention. The storage unit 10 shown in FIG. 1 implements a RAID level 1, in which an array A provides a mirror copy of an array B. However, the present invention can be applied to any RAID system from RAID0 to RAID5 as well as the embodiment shown in FIG. 1. As shown in FIG. 1, the storage unit 10 of the present invention includes the arrays A and B. The array A includes a single or a plurality of storage media, and the array A can be configured as required by a host computer. The array B can also include a single or the plurality of storage media. In the embodiment illustrated in FIG. 1, the array B stores a mirror copy of the array A, thereby enabling redundant data integrity.

The storage media used with the present invention is not particularly limited, and any rewritable storage media such as a hard disk, a CD-R, a CD-RW, a DVD, and an MO can be applied. In the present invention, each of the arrays A and B can be configured as a unit which is a separate body including same storage media such as a hard disk or can be configured as a unit including the hard disk as the storage medium and a unit individually configured by including a different medium such as the MO.

The arrays A and B are connected to controllers 14 and 16 via a connection unit 12, respectively, and transfer data in response to write and read requests from a host computer 22a or 22b. The controllers 14 and 16 are connected with each other by a proper bus line 18 or the like so that the controllers 14 and 16 can monitor the failure of the opposite one and can transfer data to the normal one in the event of the failure of any of the controllers 14 and 16. In the preferred embodiment of the present invention, each of the controllers 14 and 16 includes a serial ATA (hereinafter, referred to as a SATA) interface 32 and 48, respectively.

Specifically, the SATA 32 and 48 can comply with standards formulated by a serial ATA working group, for example, UltraSATA/1500, ATA/ATAPI-6, or any other interfaces complying such standards. The SATA standards previously known are shown in following table 1:

TABLE 1

| Speed between Host (PC) and Device | 150 Mbytes/s | 300 Mbytes/s | 600 Mbytes/s |
|---|---|---|---|
| Cable/Connector | Differential Transfer | Differential Transfer | Differential Transfer |
| Transfer Voltage | +/− 250 mV | — | — |

The standards shown in the above table are just examples, and any equivalent transfer mode capable of realizing the equivalent data transfer rate can be employed in the controllers of the present invention.

The storage unit 10 shown in FIG. 1 is further connected to other RAID systems 20a and 20b and host computers 22a and 22b. Specifically, the host computers 22a and 22b can be configured by a personal computer or a work station. As the personal computer or the work station, a personal computer or a work station can be enumerated, which enables a CPU such as PENTIUM (registered trademark), PENTIUM II (registered trademark), and PENTIUM III (registered trademark) or a compatible CPU to be mounted thereon, and enables an operating system such as WINDOWS (registered trademark), WINDOWS NT (registered trademark), OS/2 (registered trademark), UNIX, and Linux to operate. Moreover, as such personal computer or the work station, a personal computer or a work station can be enumerated, which includes a PowerPC (registered trademark) or a compatible CPU and enables an operating system such as OS/2 (registered trademark), AIX (registered trademark), and MacOS (registered trademark) to operate.

Figure 2:
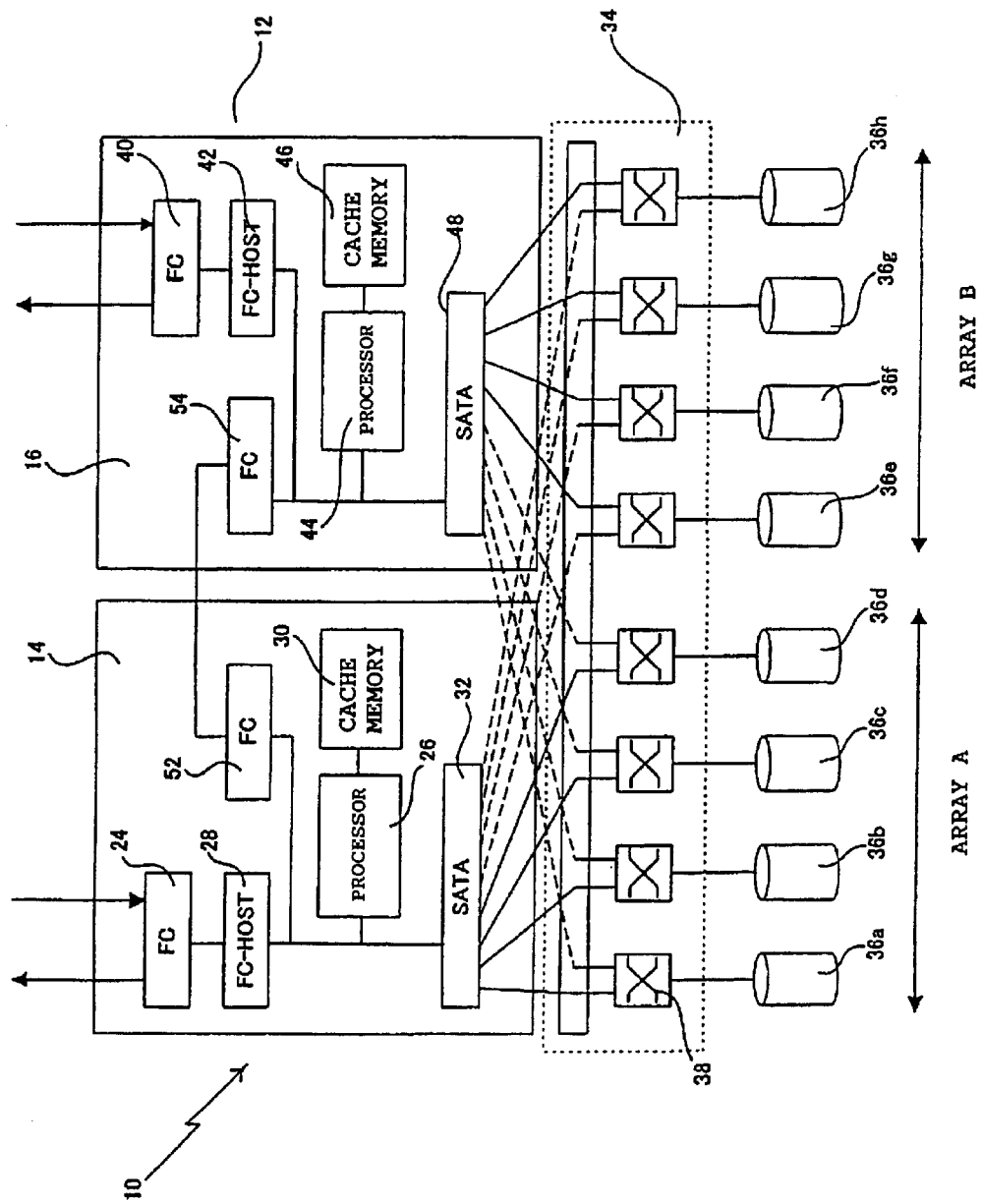
FIG. 2 is a block diagram showing a constitution of the storage unit of the present invention.

FIG. 2 is a block diagram showing in detail a portion of the storage unit 10 of the present invention shown in FIG. 1 including a controller. As shown in FIG. 2, the controller 14 includes a fiber channel connector 24, a processor 26, fiber channel-host protocol control means 28 for controlling a protocol between the fiber channel connector 24 and the processor 26, a cache memory 30 connected to the processor 26, the cache memory 30 storing transferred data, and a controller 14 for distributing the transferred data into the arrays A and B. The above-described connector, processor, protocol convert means are not limited to those of above-described constitutions, and can employ other components having equivalent functions.

In the particular embodiment shown in FIG. 2, the controller 14 uses a serial ATA ("SATA") interface unit 32. In the present invention, hereinafter, for explanation and specifically describing the present invention, the controllers 14 and 16 use the SATA. However, the present invention is not limited to the SATA interface.

In the storage unit 10 shown in FIG. 2, the above-described controller 14 and each of the arrays A and B are connected by connection means 34 including, for example, a switching means. The SATA 32 can be connected to storage media 36a to 36h constituting the arrays A and B via the connection means 34. In the particular embodiment of the storage unit shown in FIG. 2, the SATA 32 is connected to the respective storage media 36a to 36d in a normal operation (as a primary controller) as shown by solid lines in FIG. 2 via switching means 38 included in the connection means 34.

In the storage unit 10 of the present invention shown in FIG. 2, another controller 16 is further provided, which has a similar constitution to the controller 14. The controller 16 also includes a fiber channel connector 40, fiber channel-host protocol control means 42, a processor 44, and a cache memory 46. In the normal state, a SATA 48 is connected to the storage media 36e to 36h constituting the array B via the connection means 34 and the switching means 38 (as a primary controller). As shown in FIG. 2, the storage unit 10 of the present invention can cope with the redundant storage method by constituting the so-called RAID system.

In FIG. 2, the controllers 14 and 16 are connected with each other via proper communication or connection means such as fiber channel connections 52 and 54. Each of the controllers 14 and 16 detects a failure when the failure occurs in the other controller, and enables data on a mirror disk side to be transferred to the host computer without giving any load to the host computer. FIG. 2 shows that both the controllers 14 and 16 adequately operate. The SATA 32 manages the storage media 36a to 36d, and the SATA 48 manages the storage media 36e to 37h as shown by the solid lines.

The storage unit 10 of the present invention shown in FIG. 2 specifically includes means for detecting occurrence of the failure of each controller. When the failure occurs in each controller, the means detects the occurrence of the failure by a proper method. The processor which has detected the failure drives the switching means such that the SATA on a side of the connector where no failure occurred is connected to the storage media on a side where the failure occurred, thus recovering from the failure. The broken lines of FIG. 2 show a state that the switching means 52 is controlled by the above-described process.

Figure 3:
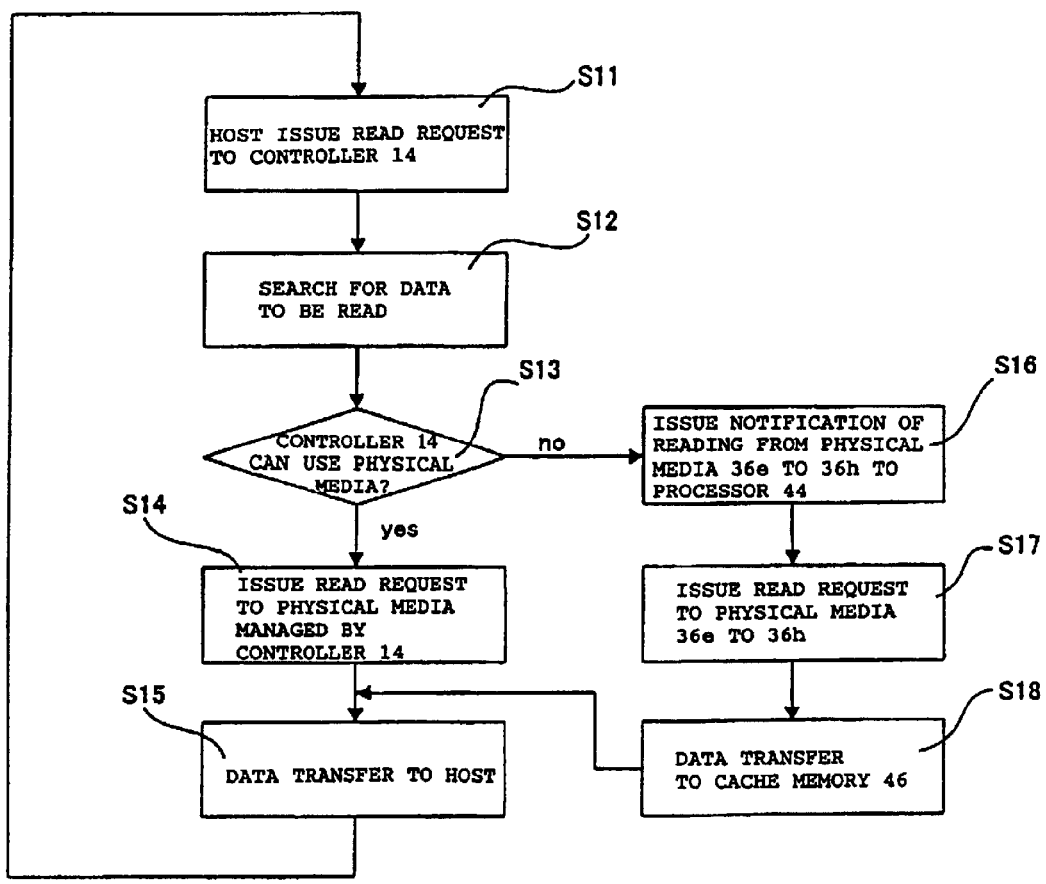
FIG. 3 is a flowchart showing a write process in the storage unit of the present invention.

FIG. 3 is a flowchart showing a process of a read operation in a case where the respective controllers controlling the arrays A and B normally operate in the storage unit 10 of the present invention. When the storage unit of the present invention normally operates, first, in step S11, the host computer issues a read request to a specific controller, for example, the controller 14 in the particular embodiment. In step S12, the processor 26 of the controller 14 having received the read request searches the cache memory 30 or the storage media 36a to 36d. When data to be read is held in the cache memory 30, the processor 26 reads the data from the cache memory 30 and transfers the data to the host computer.

When the data to be read is held in any one of the storage media 36a to 36d, in step S13, it is decided whether or not the controller 14 can use the storage media. When the controller 14 can use the storage media (yes), in step S14, the processor 26 issues a read request to the storage medium holding the data among the storage media 36a to 36d. In step S15, the processor 26 transfers the read data to the host computer via the cache memory 30. When the controller 14 has no storage medium or the controller 14 cannot access the storage media (no) for some reasons other than the failure of the controller 14, for example, maintenance of the storage medium or for some reasons such as the failure of the storage media, in step S16, the processor 26 notifies the processor 44 to perform a read operation from any one of the storage media 36e to 36h in order to read a mirror copy of data managed by the controller 16.

The processor 44 having received the notification issues a read request to the storage media 36e to 36h in step S17. In step S18, the processor 44 temporarily transfers and stores the read data in the cache memory 46, and then transfers the read data to the cache memory 30. In step S15, the read data held in the cache memory 30 is transferred by the processor 26 to the host computer having issued the read request, thus completing a series of read operations.

Figure 4:
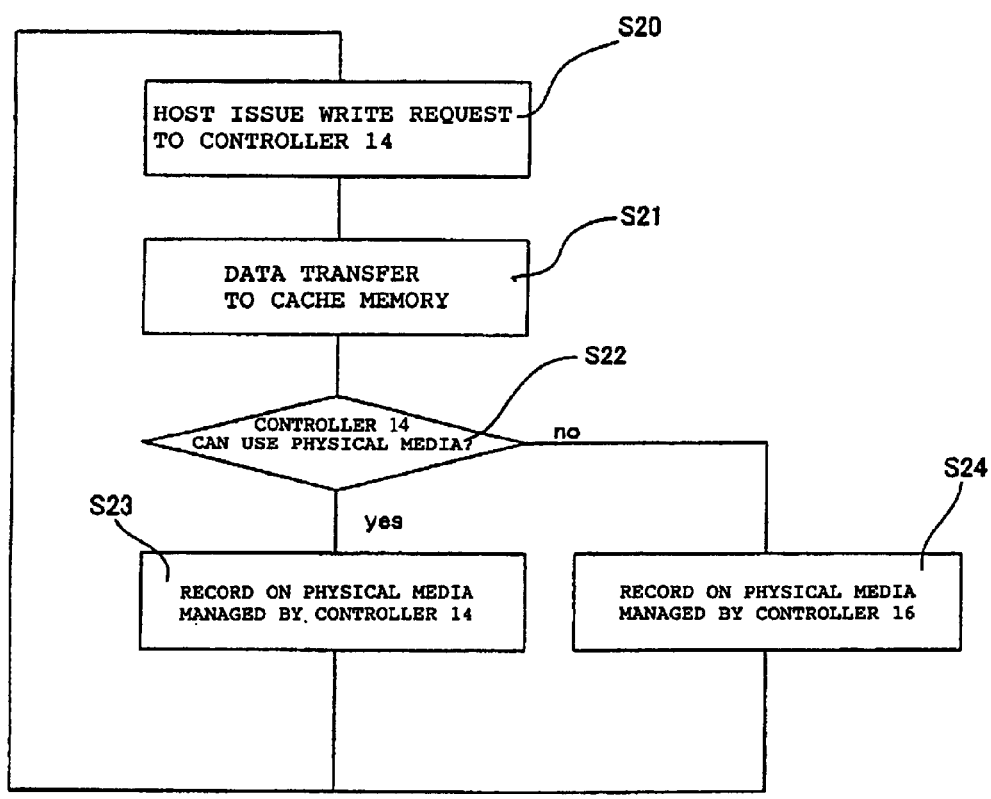
FIG. 4 is a flowchart showing a read process in the storage unit of the present invention.

FIG. 4 is a flowchart of write operation process in a case where both controllers controlling the arrays A and B normally operates in the storage unit 10 of the present invention. In a write operation shown in FIG. 4, in step S20, the host computer makes a write request to the controller 14. In step S21, data transferred from the host computer is temporarily held in the cache memory 30. Thereafter, in step S22, it is decided whether or not the storage media managed by the controller 14 are available.

When the storage media 36a to 36d managed by the controller 14 are available (yes), in step S23, writing is performed for the storage media 36a to 36d from the cache memory 30. When the storage media 36a to 36d are not available (no), in step S24, the data is transferred from the cache memory 30 to the cache memory 46, and the processor 44 performs writing for the storage media 36e to 36h, thus completing a series of operations.

Figure 5:
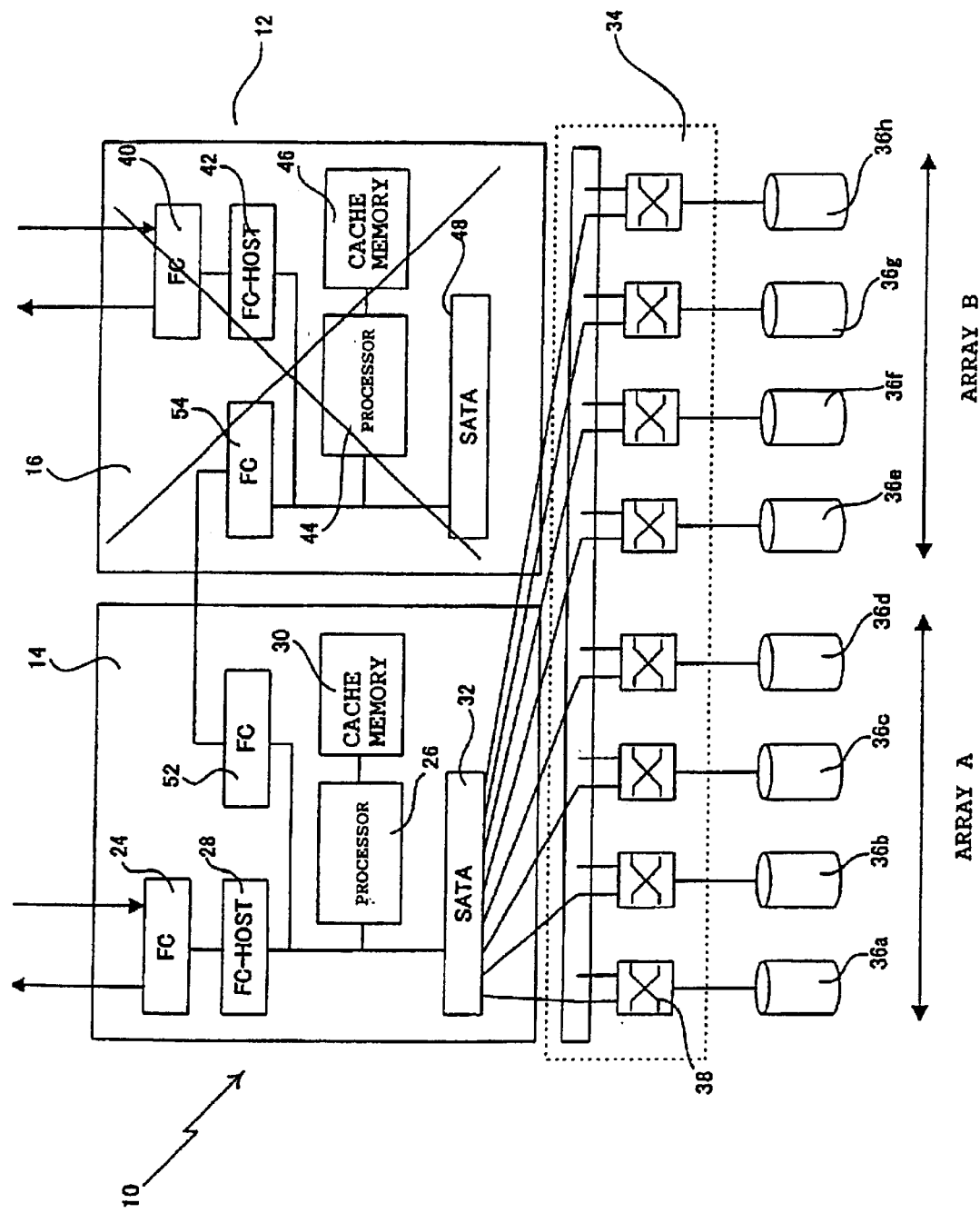
FIG. 5 is a block diagram showing an embodiment of switching in a case where a failure occurs in a controller, according to the present invention.

FIG. 5 shows a particular embodiment in which the switching means is operated for recovery from the failure when the failure occurs in the controller 16 in the storage unit 10 of the present invention. As shown in FIG. 5, it is assumed that the failure occurs in the controller 16 for some reasons and the controller 16 does not normally respond. In this stage, when the processor 26 detects the failure of the controller 16, the processor 26 drives the switching means 38 to connect the SATA 32 to the storage media 36e to 36h for which the controller 16 possesses management right originally so as to allow the SATA 32 included in the controller 14 to manage the storage media 36e to 36h which the controller 16 should manage, and the processor 26 acquires the management right of the storage media 36e to 36h.

Figure 6:
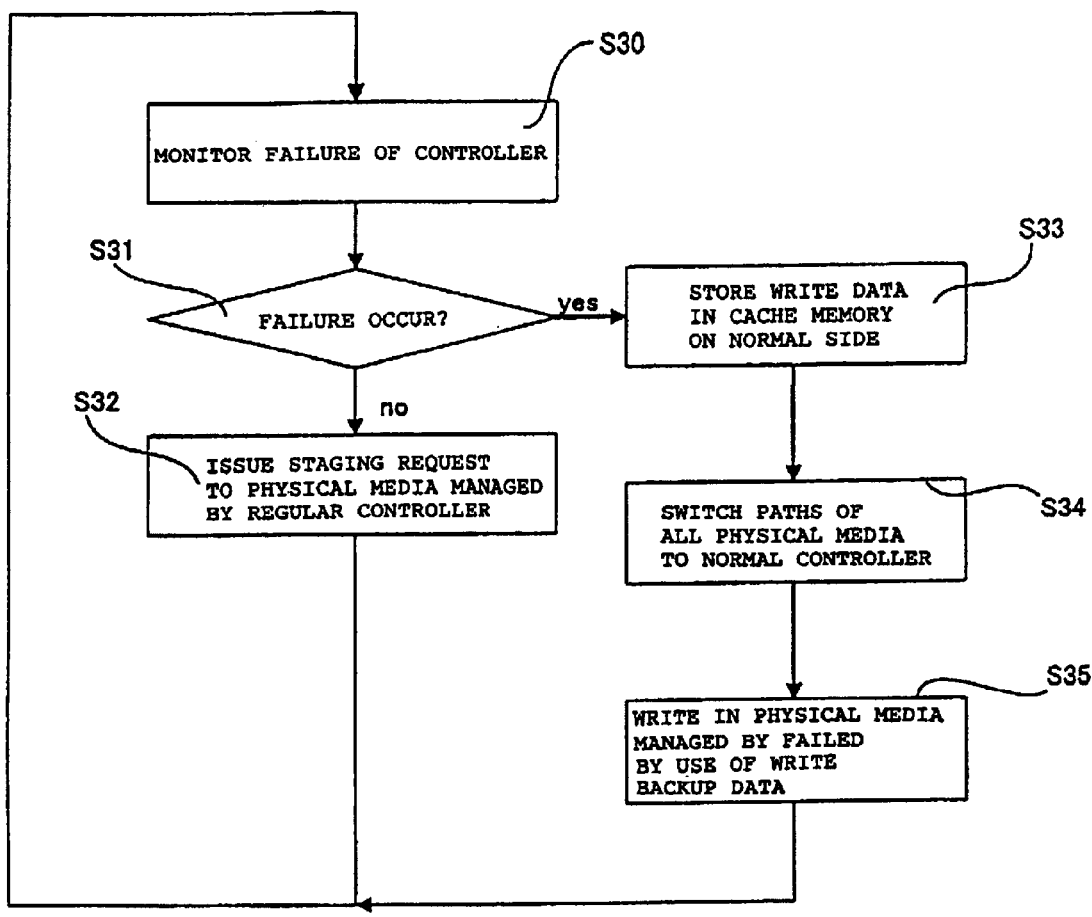
FIG. 6 is a flowchart of a failure recovery process, according to the present invention.

FIG. 6 is a flowchart schematically showing a recovery process in the event of the failure of each controller in the storage unit of the present invention. In the recovery process shown in FIG. 6, the failure between the controllers is monitored in accordance with a predetermined method in step S30, and it is decided whether or not communications between the processors are normal in step S31. When the communications are normal (no), in step S32, the usual write/read operations shown in FIGS. 3 and 4 are performed via the controller which the host computer requires.

When it is decided that the failure occurs in any one of the controllers, in step S33, the processor or the cache memory on the side where no failure occurred manages write data, which needs to be written temporarily during the failure. The write data can be managed by using a buffer memory provided on a host computer side, if appropriate. With regard to a method for monitoring occurrence of the failure in each controller, as described below in detail, the occurrence of the failure is judged based on a communication state between the processors or between the host computer and each controller. Thereafter, in step S34, the switching means 38 is operated and controlled so that the SATA 32 included in the controller on the side where no failure occurred manages all the storage media 36a to 36h.

Subsequently, in step S35, the predetermined storage medium is accessed and made to perform writing of the write data managed by the controller on the side where no failure occurred or the buffer memory of the host computer. In the present invention, by the employment of the above described recovery method, the data written from the occurrence of the failure of the controller until the recovery of the failure thereof is retained, and the data integrity can be performed at the time of the recovery while imparting redundancy.

Figure 7:
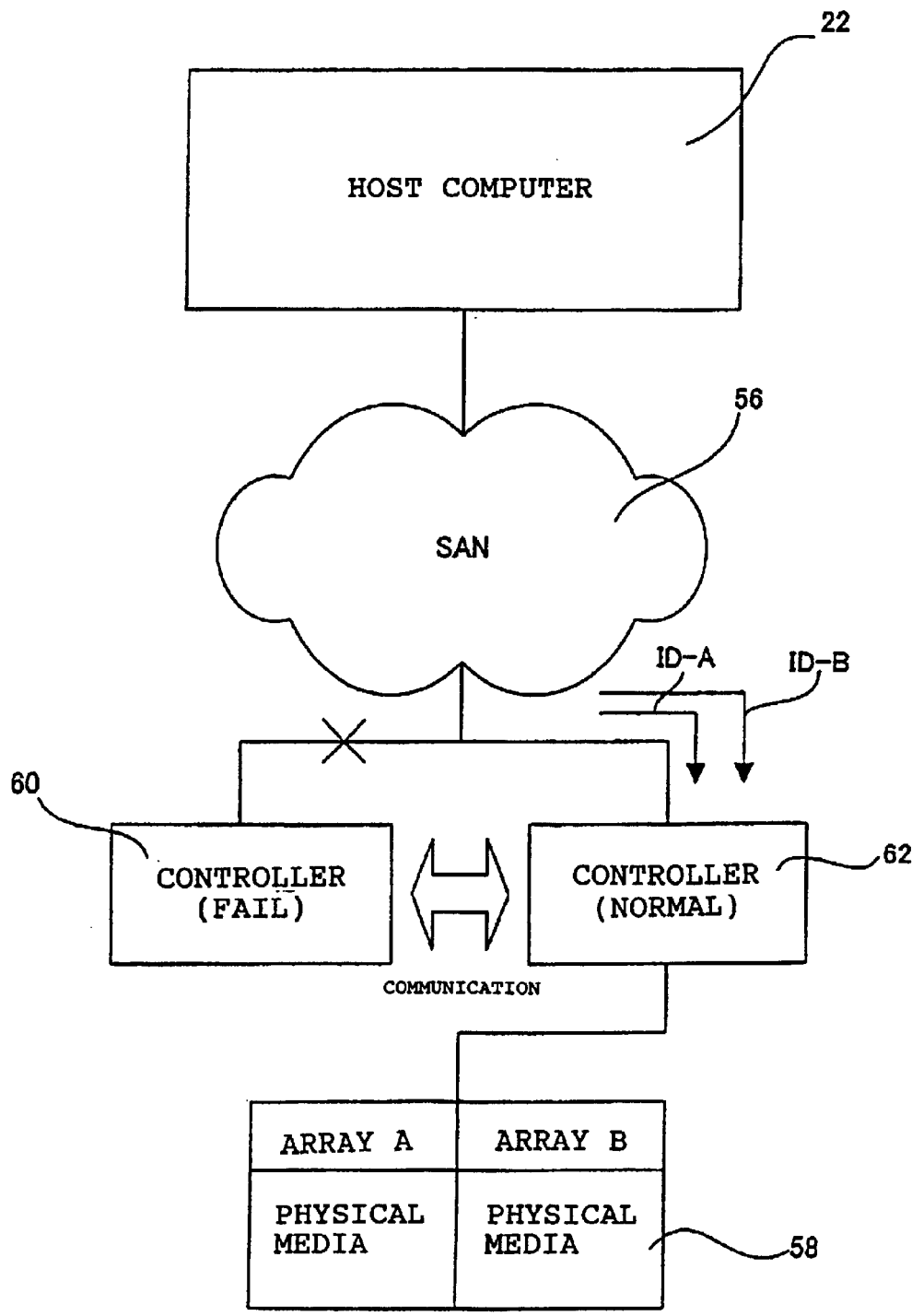
FIG. 7 is a view schematically showing a failure detection process, according to the present invention.

FIG. 7 schematically shows a process in which the failure of each controller is detected based on judgment for communications between the processors and recovery is performed. As shown in FIG. 7, the host computer 22 accesses the controllers 60 and 62 which manage the arrays A and B and the storage media 58 via a network, for example, the SAN 56. The processors included in the controllers 60 and 62 communicate with each other, and mutually monitor states of the controllers. Each of the controllers can use a table, in which an identifier of each controller and the array and the storage media managed by the identifier are registered. In the case of detecting the failure, each of the controllers can identify the array of the controller where the failure occurred and acquire the management right thereof.

As described above, each of the controllers 60 and 62 is given a unique identifier and specified by use of the identifier. Herein, description will be made by assuming that the failure occurs in the controller 60. When the failure occurs in the controller 60, the controller 62 instructs the processor included in the controller 62 to use or acquire an identifier ID-A of the controller 60.

The controller 62 which was made possible to use the identifier ID-A notifies the host computer 22 that the ID-A is available. Thereafter, the host computer 22 transmits write data which is stored by that time in the buffer memory or the like prepared by the host computer 22 to the controller 62 by use of the identifier ID-A of the controller 60. The processor and cache memory of the controller 62 write/read the received write data to/from the storage media 58 on the side which the controller 60 should originally manage.

Figure 8:
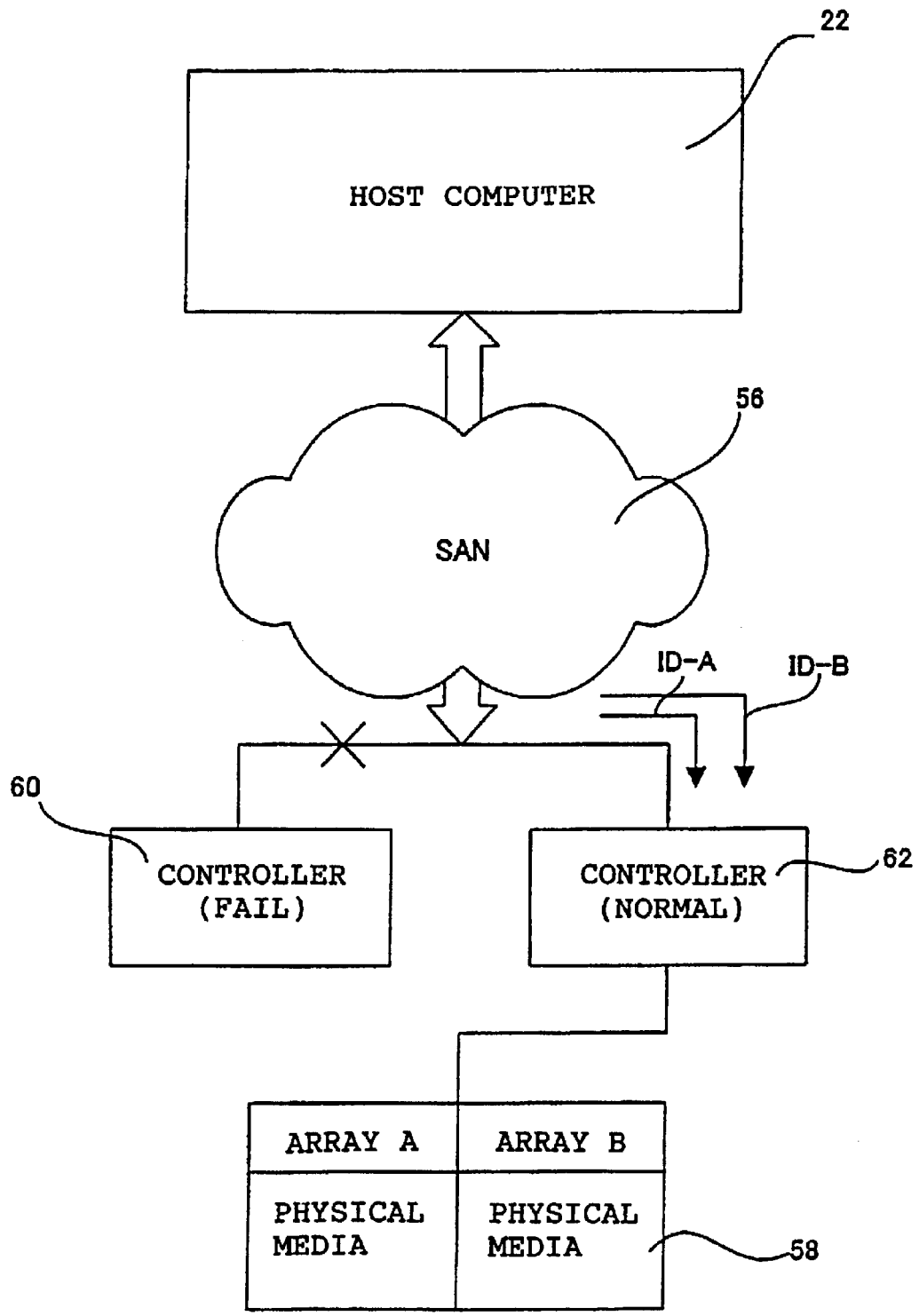
FIG. 8 is a view schematically showing another failure detection process, according to the present invention.

FIG. 8 schematically shows a process that the detection of the failure of each controller shown in FIG. 6 judged based on the communication between the host computer 22 and each of the controllers 60 and 62 and then the recovery is performed. As shown in FIG. 8, the host computer 22 and each of the controllers 60 and 62 communicate with each other, and the host computer 22 always monitors whether or not communication thereof with each of the controllers 60 and 62 is possible, thus detecting the failure of each controller. In an embodiment shown in FIG. 9, description will be made for example by assuming that the failure occurs in the controller 60.

The host computer 22 decides that the failure has occurred in the controller 60 from, for example, an event that the controller 60 does not respond to an inquiry for a predetermined period. At this point, the host computer 22 notifies the normal controller 62 of the identifier ID-A of the controller 60 which became impossible to perform the communication while allowing write data to evacuate by a proper method, and allows the controller 62 to acquire or use the identifier ID-A. The host computer 22 transfers the data to be written to only the controller 62, which has newly acquired the identifier ID-A. The controller 62 receives, from the host computer 22, data assigned to the identifier ID-A in addition to data of the identifier ID-B originally assigned. The controller 62 can perform writing for the arrays or the storage media corresponding to each identifier with reference to the held correspondence table. FIG. 9 shows an embodiment of the table for illustrating correspondence of the identifier assigned to each of the controllers explained in FIGS. 7 and 8, the controller specified by the identifier, a medium identifier assigned to each of the storage media constituting each of the arrays. The table shown in FIG. 9 can be held in storage means such as a memory of each processor included in each of the controllers 60 and 62 and an external ROM. The table shown in FIG. 9 can be also held in storage means properly rewritable such as the EEPROM in order to easily cope with changes in system settings, for example. The above described correspondence table may be composed of software and used by each processor.

As shown in FIG. 9, each controller sets, for example a management flag. In the normal state, by, for example, the management flag 2, the respective controllers write/read only the data transferred by specifying an identifier originally assigned to/from the storage media managed by the controller provided with the identifier, for example, B-1 to B-4. In the particular embodiment shown in FIG. 9, upon recognizing the occurrence of the failure, the processor on the side recognizing the occurrence of the failure in the other controller sets the management flag of the controller 60 having the identifier ID-A to 1 from 0. The write access to the controller 62 can be also processed with regard to the data to the identifier ID-A. In the present invention, a proper storage area such as a spare cache memory is provided in addition to the cache memories 30 and 46. At the same time when the above described of the occurrence of the failure is recognized, each processor instructs the spare cache memory to hold the data transferred to the identifier ID-A until the recovery process is completed.

Figure 10:
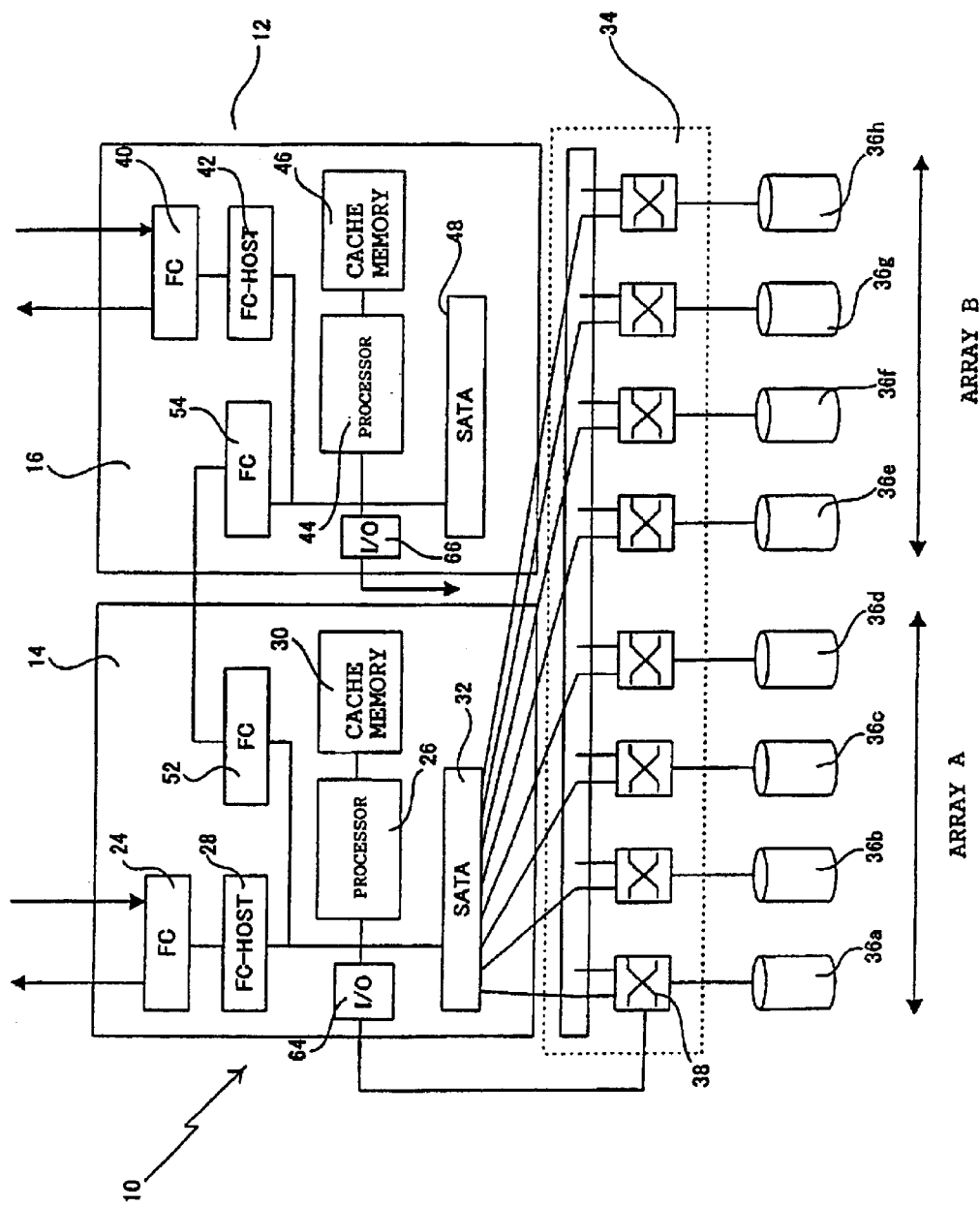
FIG. 10 is a block diagram showing a constitution of drive means for driving switching means of the present invention.

FIG. 10 is a view showing a specific embodiment in a case where the switching means 38 is operated and the management right is changed by the above described process of the present invention. As shown in FIG. 10, the processors 26 and 44 are respectively connected to input/output units 64 and 66 used as drive means for controlling the switching means 38 so as to drive the switching means 38. In the particular embodiment of the present invention, the above described switching means 38 are loaded on, for example, a portion such as a drive carrier of the storage media connected to each of the controllers 14 and 16.

Figure 11:
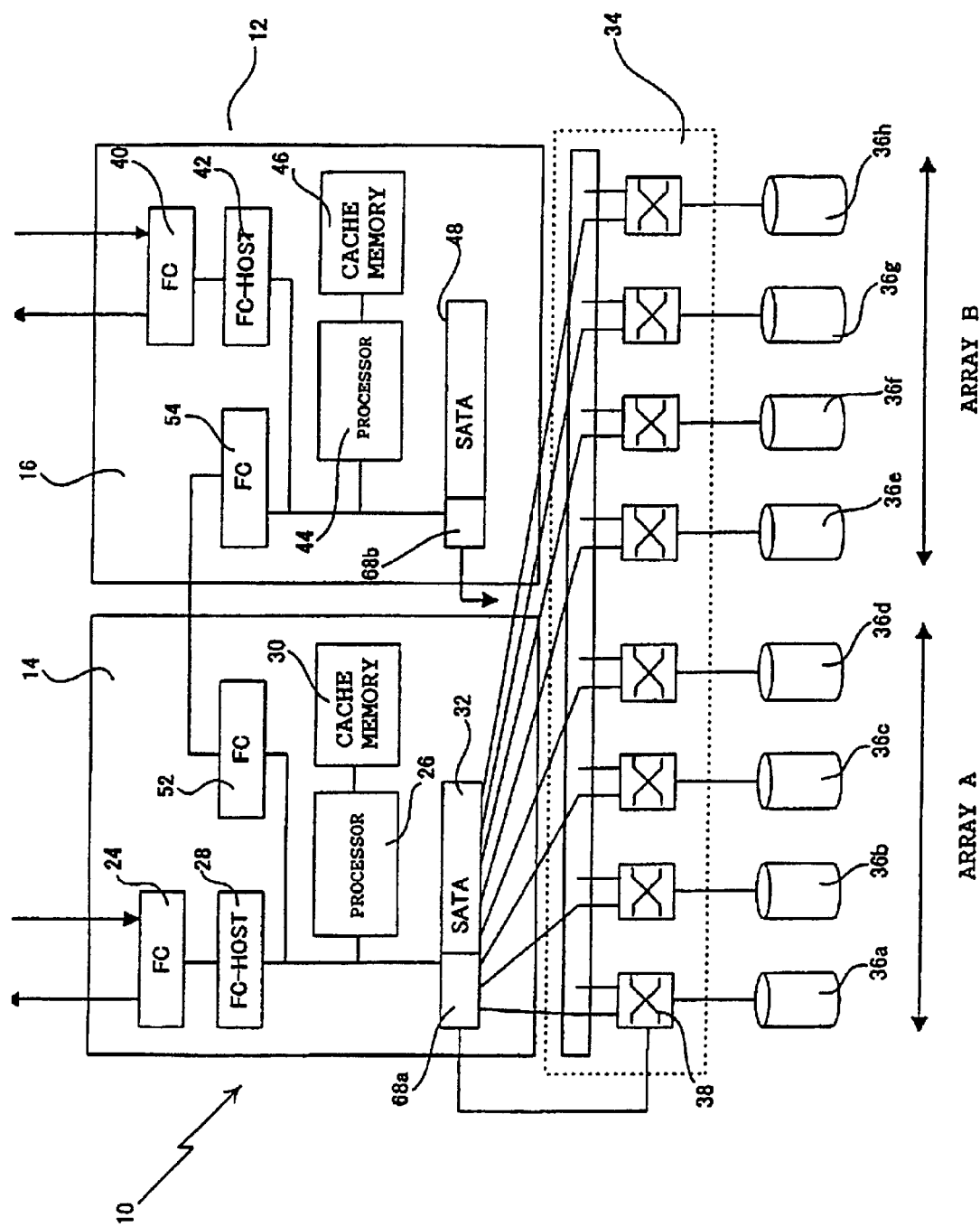
FIG. 11 is a block diagram showing another constitution of drive means for driving switching means of the present invention.

In the present invention, as another embodiment loading the switching means, the drive means of the above described switching means may be provided on the SATA. FIG. 11 shows another embodiment of the present invention, in which the SATA 32 and 48 are respectively provided with drive means 68a and 68b for driving the switching means, and the instruction is issued from the drive means of the switching means to each of the switching means.

The embodiment shown in FIG. 11 will be described in more detail. For example, when the processor 26 of the controller 14 detects the failure of the controller 16, the processor 26 issues an instruction to the SATA 32 managed by the processor 26, by using the table shown in FIG. 9, and drives the switching means to connect the storage media 36e to 36h managed by the controller 16, where the failure occurred. The processor 26 drives the switching means 38 to change the management states of the storage media, whereby the proper recovery can be performed in the event of the failure of each controller.

In the present invention, the use of the point-to-point controller including the SATA makes it possible to use the comparably simple switching means, thus achieving effective switching of the controller. Moreover, the storage unit 10 of the present invention employs the above described constitution, whereby redundancy with high reliability can be imparted, the data integrity is improved, and the information storage system of high cost performance ratio can be provided.

Figures 12, 13:
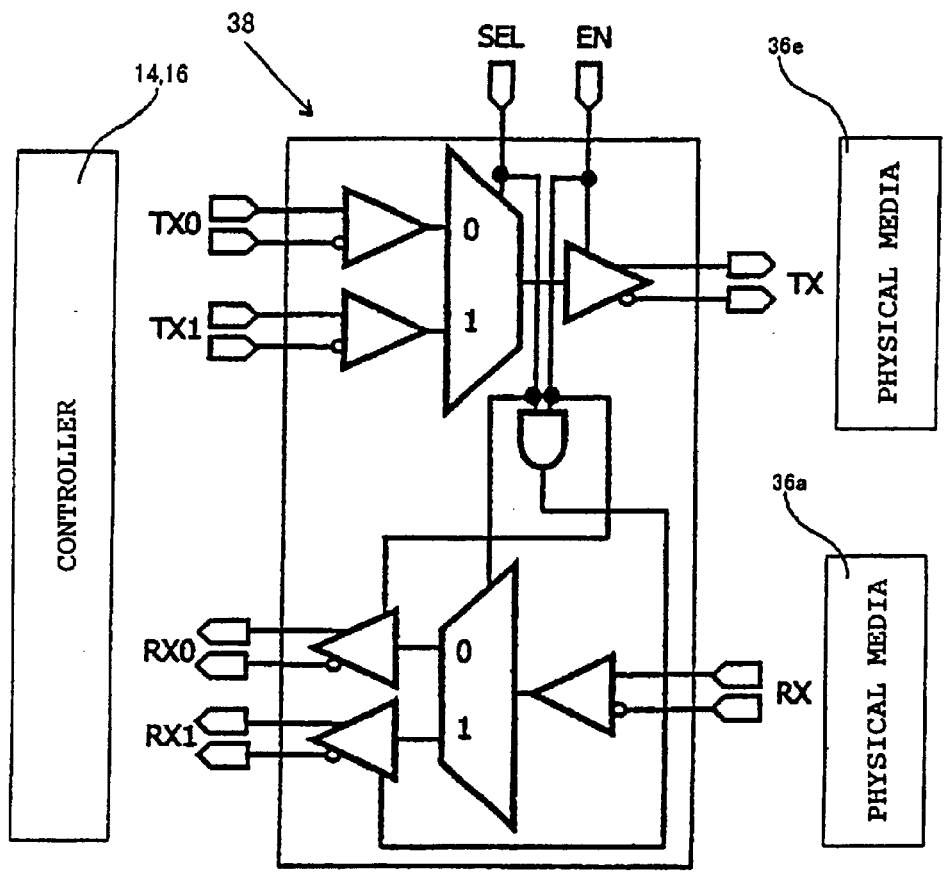
FIG. 12 is a view showing an embodiment of the switching means of the present invention.
FIG. 13 is a view showing input and output status of the switching means shown in FIG. 12.

FIG. 12 is a view showing in detail a constitution of the embodiment of the switching means 38 used in the present invention. In the particular embodiment of the present invention, as described above, the switching means 38 shown in FIG. 12 can be provided in the connector means 34 for connecting each of the storage media and each of the controllers or provided in the SATAs 32 and 48 included in the controllers. In FIG. 12, reference symbols TX0 and RX0 indicate ports managed by one SATA, and reference symbols TX1 and RX1 indicate ports managed by the other SATA. In the normal operation, for example, the port TX0 and the port RX1 are connected to the different SATA, so that write/read operations can be performed for the storage media via ports TX and RX.

The particular embodiment of the present invention will be described in more detail. When failure occurs in the controller managing the port TX0 and the port RX0, the drive means of the switching means included in the input/output unit or the SATA which has received a notification of the occurrence of the failure from the processor issues a select signal SEL and an enable signal EN to the switching means 38. The select signal SEL and the enable signal EN are inputted to the switching means 38, and drives the switching means 38 to switch a path to the side of the controller normally operating and establish a path via the TX or the RX, thus transferring the management right. FIG. 13 shows status of the enable signal EN, status of the select signal SEL, and connection status of the port TX. In FIG. 13, reference symbol HZ denotes high impedance state.

As shown in FIG. 13, for example, the port TX is switched to the port TX0 or the port TX1 in accordance with the status of the enable signal EN and the select signal SEL, and can be controlled by any one of the controllers. In the present invention, as shown in FIG. 13, the switching can be essentially performed only by the select signal SN. As shown in FIG. 13, use of the select signal SEL in a state where the select signal SEL is superposed on the enable signal EN makes it possible to perform the switching by selectively utilizing the high impedance state, and hence maintenance such as a hot swap in which the corresponding storage medium or the like is replaced with new one is made possible while keeping the system driven.

Figure 14:
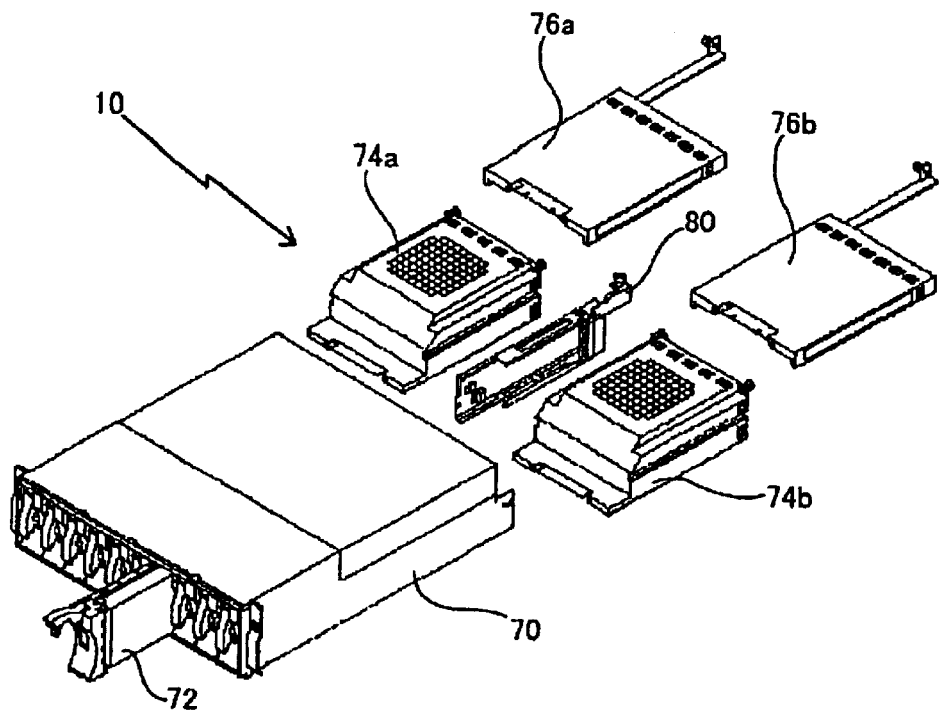
FIG. 14 is an exploded perspective view showing an embodiment of the storage unit of the present invention.

FIG. 14 is an exploded perspective view showing the storage unit 10 of a particular embodiment of the present invention. The storage unit 10 of the present invention can be preferably used for constituting the RAID system, for example in the information storage system such as the storage area network (SAN). In the embodiment shown in FIG. 14, the storage unit 10 of the present invention includes a case 70, storage media 72 held in the case 70 such as the hard disk drive, power supply units 74a and 74b for driving the storage media 72 and supplying necessary power to the storage unit 10, controllers 76a and 76b provided with correspondence to the arrays for controlling the arrays, the arrays constituting the RAID system composed of the storage media 72, and a connector unit 80 including switching means for switching the controllers 76a and 76b.

The controllers 76a and 76b are connected to a not-shown host computer, and data transfer between the host computer and each of the storage media 72 is made possible. According to the present invention, when a failure occurs in each controller, the connector unit 80 can allow the normal controller to manage all the storage media 72.

Figure 15:
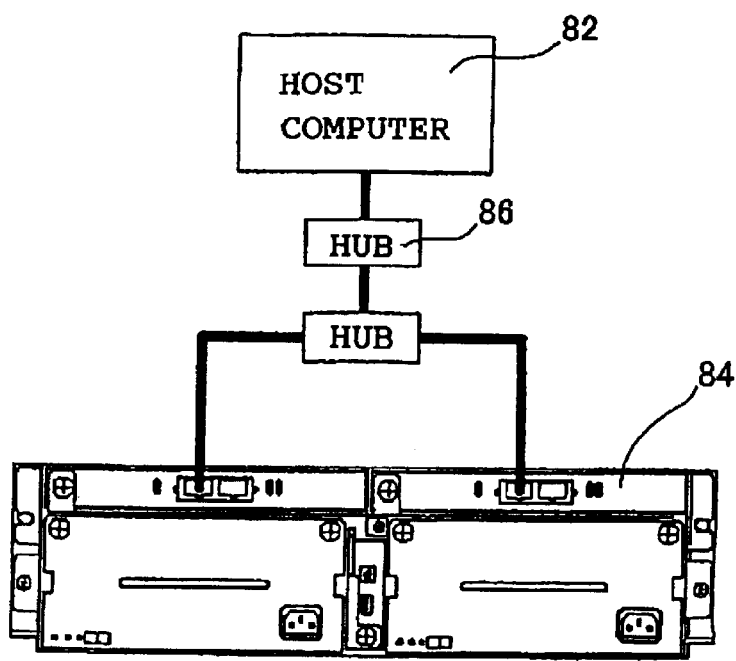
FIG. 15 is a view showing an embodiment of an information processing apparatus of the present invention.

FIG. 15 is a view showing an embodiment in a case where the information processing apparatus is constituted by connecting the storage unit 10 of the present invention and information processing means such as a host computer. In the information processing apparatus shown in FIG. 15, a host computer 82 and a storage unit 84 of the present invention are connected by use of, for example a fiber channel hub 86. The host computer 82 and the storage unit 84 are configured to enable mutual data transfer between the host computer 82 and the storage unit 84.

In FIG. 15, if the fiber channel hub 86 is configured as a fiber channel switch, the storage unit 84 can be configured as a storage area network (SAN). Moreover, the host computer 82 shown in FIG. 15 can be configured as a stand-alone computer and furthermore configured as a server providing information for client computers via a network such as the Ethernet (registered trademark).

Figure 16:
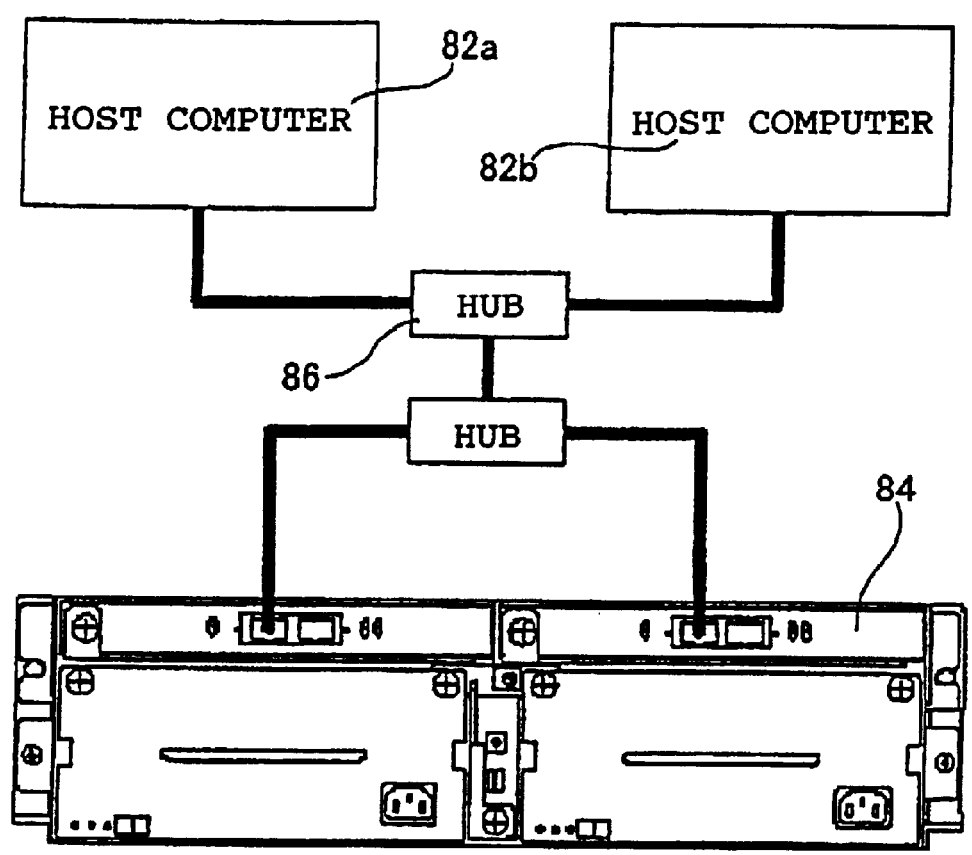
FIG. 16 is a view showing another embodiment of the information processing apparatus of the present invention.
Figure 17:
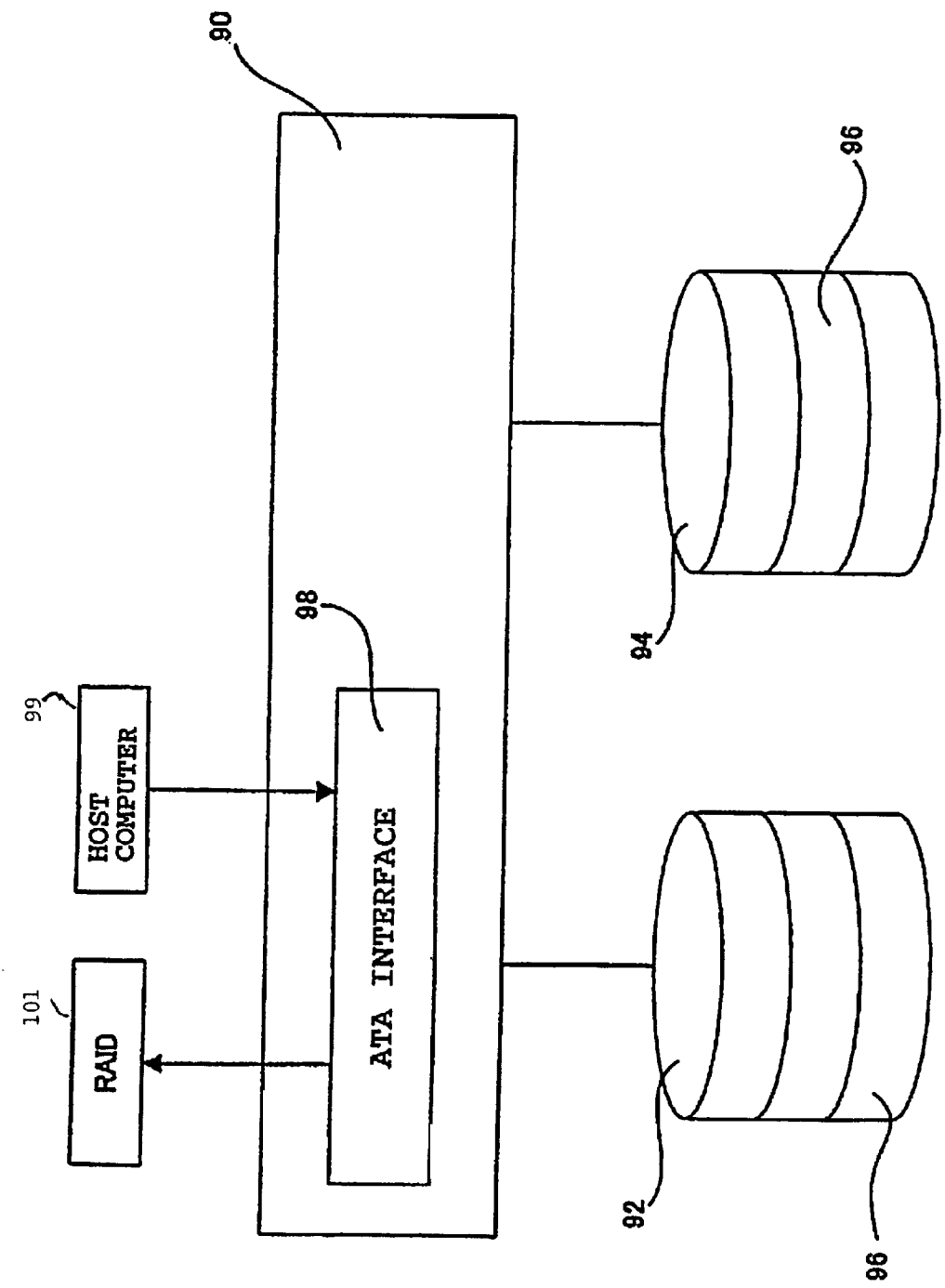
FIG. 17 is a view schematically showing a constitution example of a RAID system using a conventional parallel ATA interface, according to the Prior Art.
Figure 18:
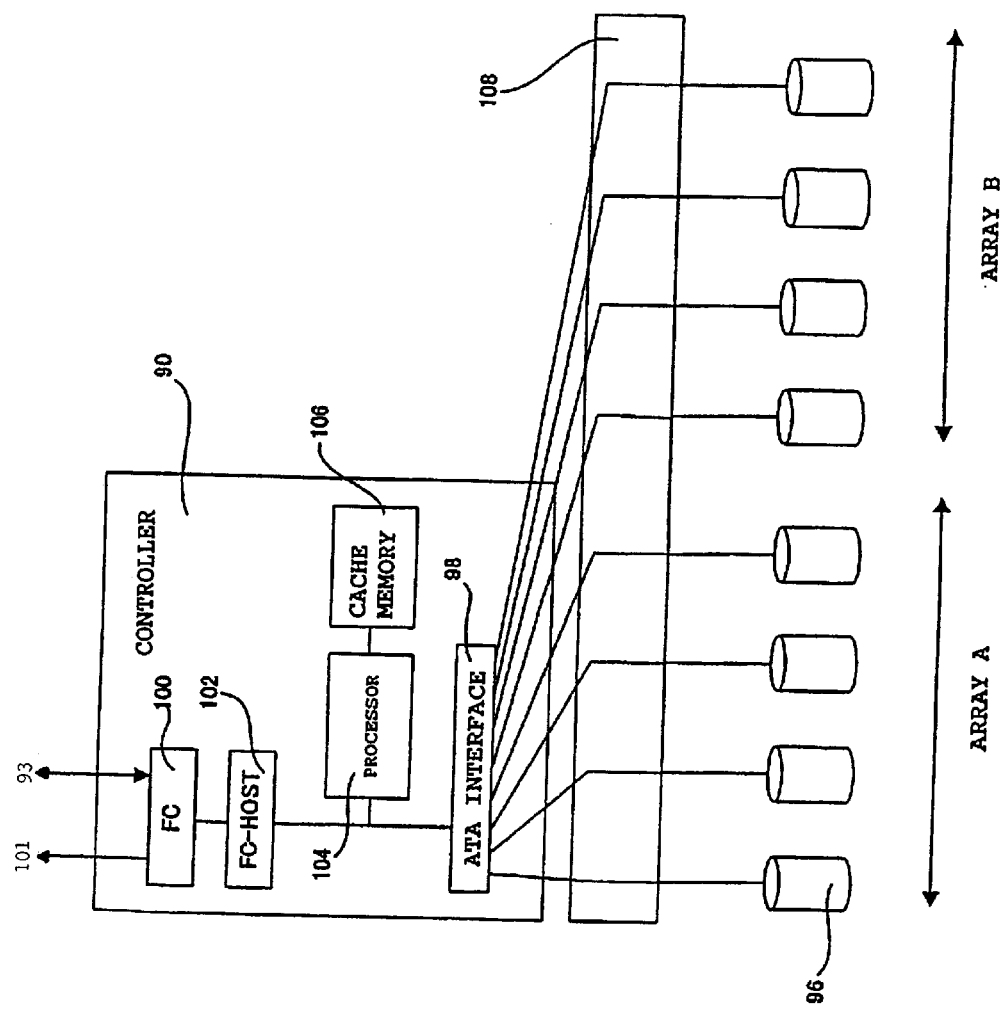
FIG. 18 is a view showing in detail the constitution example of the RAID system using the conventional parallel ATA interface, according to the Prior Art.

FIG. 16 shows another embodiment of the information processing apparatus of the present invention. In the embodiment shown in FIG. 16, each of two controllers included in the storage unit 84 is connected to host computers 82a and 82b via the fiber channel hub 86, thus constituting the RAID system of a redundancy method using clustering. In the present invention, as shown in FIG. 16, the above described recovery method can be configured by using a plurality of information processing means such as host computers and a plurality of controllers. In the embodiment shown in FIG. 16, the detection of the failure of each controller can be achieved by monitoring communication between the controllers. Alternatively, the embodiment can employ a constitution that each of the host computers monitors the controller managed by the host computer itself and in the event of the failure, the host computer makes an instruction to the normal controller side.

Description has been heretofore made on the present invention based on the embodiments shown in the drawings. However, the present invention is not limited to the embodiments shown in the drawings. As long as the switching means can properly perform switching of the arrays, the switching means can be configured as an input/output unit on a substrate constituting the controller, or can be modularized on a substrate constituting the SATA. Moreover, the switching means can be arranged on a drive carrier for mounting the hard disk drive, and furthermore can be arranged on any other components.

Although the preferred embodiment of the present invention has been described in detail, it should be understood that various changes, substitutions and alternations can be made therein without departing from spirit and scope of the inventions as defined by the appended claims.

What is claimed is:

1. A storage control and switch unit for transferring data between a host computer and first, second, third and fourth storage media, said storage control and switch unit comprising:

a first storage controller having an operative point-to-point connection with each of said first and second storage media to manage arrays on said first and second storage media and having an inoperative point-to-point connection to each of said third and fourth storage media;

a second storage controller having an operative point-to-point connection with each of said third and fourth storage media to manage arrays on said third and fourth storage media and having an inoperative point-to-point connection to each of said first and second storage media;

first, second, third and fourth switches logically interposed between said first, second, third and fourth storage media, respectively, and said first and second storage controllers to select which point-to-point connection to each storage media is operative and which point-to-point connection to the storage media is inoperative; and means, responsive to failure of one of said storage controllers, for directing the other storage controller to change the operable switches of said one storage controller to inoperable and chance the inoperable switches of said other storage controller to operable and granting said other storage controller management authority for the arrays controlled by said one storage controller before said failure; and wherein said granting means includes a table which includes first, second, third and fourth identifiers for said first, second, third and fourth storage media, respectively.

2. The storage control and switch unit according to claim 1, wherein said arrays constitute a RAID system.

3. The storage control and switch unit according to claim 1, wherein the detecting means including a fiber channel connection between said first and second storage controllers to detect whether communication is normal between said first and second storage controllers.

4. A storage control and switch unit for transferring data between a host computer and first, second, third and fourth storage media, said storage control and switch unit comprising:

a first storage controller having an operative point-to-point connection with each of said first and second storage media to manage arrays on said first and second storage media and having an inoperative point-to-point connection to each of said third and fourth storage media;

a second storage controller having an operative point-to-point connection with each of said third and fourth storage media to manage arrays on said third and fourth storage media and having an inoperative point-to-point connection to each of said first and second storage media;

first, second, third and fourth switches logically interposed between said first, second, third and fourth storage media, respectively, and said first and second storage controllers to select which point-to-point connection to each storage media is operative and which point-to-point connection to the storage media is inoperative; and means, responsive to failure of one of said storage controllers, for directing the other storage controller to change the operable switches of said one storage controller to inoperable and change the inoperable switches of said other storage controller to operable and granting said other storage controller management authority for the arrays controlled by said one storage controller before said failure; and wherein in response to failure of said one storage controller, said other storage controller includes means for acquiring an identifier unique to said one storage controller and changing a management state of said first and second storage media using said identifier such that said other storage controller manages said first and second storage media instead of said one storage controller.

5. The storage control and switch unit according to claim 4 further comprising a serial ATA interface unit within each of the storage controllers to transfer data between the storage controller and the switches operable by the storage controller.

6. The storage control and switch unit according to claim 4, further comprising means for each of the storage controllers to detect a failure in the other storage controller.

7. The storage control and switch unit according to claim 4, wherein each of said storage controllers includes a serial ATA interface for communication with the respective switches.

8. The storage control and switch unit according to claim 4, wherein the switches change a management state of the arrays within said first and second storage media such that said other storage controller manages said arrays within said first and second storage media in response to the detection of the failure of said one storage controller.

9. A recovery method of recovering from a failure in a data storage system, the data storage system including a multiplicity of data storage arrays in a respective multiplicity of storage media and a plurality of point-to-point controllers, which are connected to the respective storage media via respective switches to manage the plurality of arrays, each of the point-to-point controllers being connectable to all of the storage media, said method comprising the steps of:

detecting failure of one of the point-to-point controllers, and in response, changing the switches to interconnect another of said point-to-point controllers to the storage media managed by the failed controller immediately before said failure; and changing management states of the arrays within said storage media managed by the failed controller immediately before said failure such that said other point-to-point controller manages said arrays; and wherein said step of changing switches includes a step of extracting an identifier from a table, said identifier being given to each of the plurality of point-to-point controllers and corresponding to a storage medium managed by said each point-to-point controller.

10. The recovery method according to claim 9, wherein said plurality of arrays constitute a RAID system.

11. A recovery method of recovering from a failure in a data storage system, the data storage system including a multiplicity of data storage arrays in a respective multiplicity of storage media and a plurality of point-to-point controllers, which are connected to the respective storage media via respective switches to manage the plurality of arrays, each of the point-to-point controllers being connectable to all of the storage media, said method comprising the steps of:

detecting failure of one of the point-to-point controllers, and in response, changing the switches to interconnect another of said point-to-point controllers to the storage media managed by the failed controller immediately before said failure; and changing management states of the arrays within said storage media managed by the failed controller immediately before said failure such that said other point-to-point controller manages said arrays; and wherein in response to detecting the failure of one of the point-to-point controllers, further comprising the steps of:

acquiring an identifier unique to the point-to-point controller where the failure has occurred; and executing a predetermined program for changing the management state by use of the identifier unique to the point-to-point controller where the failure occurred.

12. The recovery method according to claim 11, wherein each of the plurality of point-to-point controllers includes a serial ATA interface for communication with the respective switch.

13. The recovery method according to claim 11, wherein said other point-to-point controller detects the failure of said one point-to-point controller by sensing that communication between said other point-to-controller and said one point-to-point controller is not normal.

* * * * *